United States Patent
Lin et al.

(10) Patent No.: US 12,304,419 B1
(45) Date of Patent: May 20, 2025

(54) SEATBELT ANCHORAGE WITH ENERGY ABSORPTION FOR FRONTAL IMPACT PROTECTION

(71) Applicant: GM Global Technology Operations LLC, Detroit, MI (US)

(72) Inventors: Chin-Hsu Lin, Troy, MI (US); Ashish Nayak, Bhopal (IN); Chang Kyu Son, Rochester Hills, MI (US); Nick Colonna, Vaughan (CA); Mitesh Lalwala, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/583,119

(22) Filed: Feb. 21, 2024

(51) Int. Cl.
    *B60R 22/185* (2006.01)
    *B60R 22/26* (2006.01)

(52) U.S. Cl.
    CPC ............ *B60R 22/185* (2013.01); *B60R 22/26* (2013.01)

(58) Field of Classification Search
    CPC ..... B60R 22/206; B60R 22/26; B60R 22/185; B60R 22/1955; B60N 2/4221; B60N 2/42736; B60N 2/42718; B60N 2/42763
    See application file for complete search history.

(56) References Cited

U.S. PATENT DOCUMENTS

| | | | |
|---|---|---|---|
| 9,120,448 B2 * | 9/2015 | Nagasawa | B60R 21/01544 |
| 9,156,433 B2 * | 10/2015 | Nagasawa, Sr. | A44B 11/2561 |
| 2006/0042850 A1 * | 3/2006 | Mendis | B60R 22/28 180/268 |
| 2011/0121620 A1 * | 5/2011 | Masutani | B60R 22/26 297/216.1 |
| 2011/0121621 A1 * | 5/2011 | Masutani | B60N 2/4221 297/216.1 |
| 2011/0156457 A1 * | 6/2011 | Masutani | B60N 2/7094 297/216.1 |
| 2019/0176749 A1 * | 6/2019 | Jaradi | B60R 22/20 |

FOREIGN PATENT DOCUMENTS

JP      2009149271 A * 7/2009 ........... B60N 2/4221

OTHER PUBLICATIONS

Eiji Masutani, Vehicular Seat, Jul. 9, 2009, EPO, JP 2009-149271 A, Machine Translation of Description (Year: 2009).*

* cited by examiner

*Primary Examiner* — James A English
(74) *Attorney, Agent, or Firm* — Vivacqua Crane, PLLC (57) ABSTRACT

A seatbelt anchorage system includes a vehicle seat connected in a vehicle. A seat belt assembly of the vehicle seat includes an extending seat belt shoulder strap portion, a lap belt section, and a buckle releasably connected to a first buckle connector defining a first anchor connected by a first pin to a seat structural member. The first pin and the first buckle connector together displace during a vehicle collision event from an initial to a final first buckle connector position forward of the initial position to mitigate against an occupant submarining motion. The shoulder strap portion is fixed to a second buckle connector defining a second anchor connected by a second pin to the seat structural member. The second pin and the second buckle connector displace during the vehicle collision event from an initial to a final second buckle connector position forward of the initial second buckle connector position.

9 Claims, 8 Drawing Sheets

SEATBELT ANCHORAGE WITH ENERGY ABSORPTION FOR FRONTAL IMPACT PROTECTION

INTRODUCTION

The present disclosure relates to vehicle seatbelts and vehicle seatbelt control systems for vehicles.

In vehicle fixed belt anchorage designs, a seat occupant may slide forward during a frontal impact event. This forward motion may change by reducing a lap belt angle to a vehicle floor. The lap belt angle change may potentially cause occupant submarining issues wherein the occupant may slide partially beneath the lap belt, thereby reducing effectiveness of the lap belt. A severity of the submarining depends on impact severity, occupant size, and a lap belt position.

Thus, while current systems and methods to reduce or mitigate vehicle occupant submarining during a vehicle impact event achieve their intended purpose, there is a need for a new and improved system and method to anchor an occupant in a vehicle seat.

SUMMARY

According to several aspects, a seatbelt anchorage system comprises a vehicle seat connected in a vehicle. A seat belt assembly of the vehicle seat includes an extending seat belt shoulder strap portion, a lap belt section, and a buckle releasably connected to a first buckle connector, the first buckle connector defining a first anchor connected by a first pin to a seat structural member. The first pin and the first buckle connector together displace during a vehicle collision event from an initial first buckle connector position to a final first buckle connector position forward of the initial first buckle connector position to mitigate against a submarining motion of an occupant of the vehicle seat. The seat belt shoulder strap portion is fixed to a second buckle connector, the second buckle connector defining a second anchor connected by a second pin to the seat structural member. The second pin and the second buckle connector together displace during the vehicle collision event from an initial second buckle connector position to a final second buckle connector position forward of the initial second buckle connector position.

In another aspect of the present disclosure, the lap belt section during use of the seat belt assembly is maintained directly in contact with a hip portion of an occupant of the vehicle seat by the first anchor and the second anchor and resists displacement of the occupant in a forward direction and partially under the lap belt section defining the submarining motion during the vehicle collision event.

In another aspect of the present disclosure, an angular orientation of the first buckle connector to a floor of the vehicle and of the second buckle connector with respect to the floor of the vehicle are retained during displacement of the first buckle connector to the final first buckle connector position, and during displacement of the second buckle connector to the final second buckle connector position.

In another aspect of the present disclosure, a first energy storage device in contact with the first buckle connector. A second energy storage device is in contact with the second buckle connector. The first energy storage device and the second energy storage device act individually to resist the forward displacement of the first buckle connector and the second buckle connector and to mitigate against the occupant submarining motion.

In another aspect of the present disclosure, the first energy storage device and the second energy storage device individually define one of: a compression spring individually positioned forward of the first buckle connector and the second buckle connector and compressed by forward displacement of the first buckle connector or the second buckle connector; and a tension spring individually positioned rearward of the first buckle connector and the second buckle connector and elastically extended by forward displacement of the first buckle connector or the second buckle connector.

In another aspect of the present disclosure, a seat belt link is integrally connected to and extends from the first buckle connector. The seat belt link receives the first pin, wherein a biasing force of the first energy storage device mitigates against rotation of the seat belt link about a central axis of the first pin, retaining the lap belt section in contact with the hip portion of the occupant.

In another aspect of the present disclosure, the first energy storage device and the second energy storage device individually define a compression spring individually positioned forward of the first buckle connector and the second buckle connector and compressed by forward displacement of the first buckle connector or the second buckle connector.

In another aspect of the present disclosure, the first energy storage device and the second energy storage device individually define a tension spring individually positioned rearward of the first buckle connector and the second buckle connector and elastically extended by forward displacement of the first buckle connector or the second buckle connector.

In another aspect of the present disclosure, a seat cushion of the vehicle seat has a first bolster and a second bolster opposed to the first bolster, the first and second bolsters angled inward toward each other and downward. A first curved slot is created in the first bolster. A first seat belt link is connected to the first buckle connector and is displaced within a first slot portion of the first curved slot initially in a forward direction until the first seat belt link reaches an inward curving portion of the first curved slot, after which the first buckle connector displaces both in an inward direction and a downward direction pulling the lap belt section downward into contact with the hip portion of the occupant.

In another aspect of the present disclosure, a second curved slot is created in the second bolster. A second seat belt link is connected to the second buckle connector and is displaced within a first slot portion of the second curved slot initially in a forward direction until the seat belt link reaches an inward curving portion of the second curved slot, after which the second buckle connector displaces both in an inward direction and a downward direction pulling the lap belt section downward into contact with the hip portion of the occupant.

According to several aspects, a vehicle seatbelt anchorage system, comprises a vehicle seat connected to a seat frame structural member in a vehicle. A seat back frame member is rotatably connected to the seat frame structural member by a pin. A hook-shaped bar is received through the pin with a straight segment of the bar extending through and fixed to the pin, the hook-shaped bar rotating during axial rotation of the pin. A hook-end of the hook-shaped bar is positioned to directly contact a buckle mounting bolt, the buckle mounting bolt slidably positioned and displaced within a slotted chamber and contacting a biasing member. During rotation of the seat back frame member with respect to the seat frame structural member about an arc of rotation away from an upright position to a reclined position, the hook-shaped bar rotates together with the pin such that the hook-end displaces the buckle mounting bolt which compresses the biasing member.

In another aspect of the present disclosure, the slotted chamber directs a forward travel motion of the buckle mounting bolt.

In another aspect of the present disclosure, the slotted chamber also directs a downward travel motion of the buckle mounting bolt, the downward travel motion pulling the lap belt downward to maintain positive frictional contact of the lap belt with the hip portion of the occupant.

In another aspect of the present disclosure, a biasing member is contacted by the buckle mounting bolt when the buckle mounting bolt is slidably displaced within the slotted chamber.

In another aspect of the present disclosure, the biasing member defines a compression spring.

In another aspect of the present disclosure, a stop member is provided having the biasing member positioned between the stop member and the buckle mounting bolt to retain the biasing member.

In another aspect of the present disclosure, a seat belt assembly of the vehicle seat includes: an extending seat belt shoulder strap portion, a lap belt section, and a buckle releasably connected to a first buckle connector; and a tensioning mechanism extending and retracting the seat belt shoulder strap portion, the seat belt shoulder strap portion fixed at one end to a second buckle connector.

According to several aspects, a method to mitigate vehicle occupant submarining during a vehicle collision event comprises: connecting a vehicle seat in a vehicle; providing a seat belt assembly of the vehicle seat having an extending seat belt shoulder strap portion, a lap belt section, and a buckle releasably connected to a first buckle connector; rotatably connecting the first buckle connector by a first pin to a seat structural member; and displacing the first pin and the first buckle connector together during a vehicle collision event from an initial first buckle connector position to a final first buckle connector position forward of the initial first buckle connector position to mitigate against an occupant submarining motion.

In another aspect of the present disclosure, the method includes: connecting a seat belt link to the buckle connector; and rotatably connecting the seat belt link to a seat structural member using a pin to allow rotation and angular displacement of the seat belt link.

In another aspect of the present disclosure, the method includes: slidably positioning the pin in an angular slot allowing the pin to displace within the angular slot about an arc of rotation; and maintaining an angle beta (B) with respect to a horizontal plane extending through an axial center of the first pin by a tensioning device rotating to induce a tensioning force on a tensioning strap connected to the first pin as the pin displaces in the angular slot during forward motion of the occupant in a forward direction.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
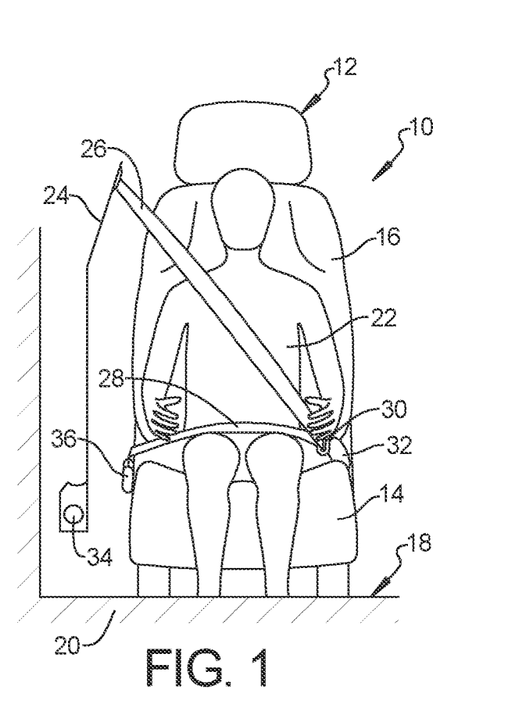
FIG. 1 is a front elevational view looking rearward of a seatbelt anchorage system for a vehicle seat according to an exemplary aspect.

Referring to FIG. 1, a seatbelt anchorage system 10 is provided for a vehicle seat 12 having a seat cushion 14 and a seat back 16 which rotates with respect to the seat cushion 14. The vehicle seat 12 is connected to a vehicle floor 18 of a vehicle 20. The vehicle 20 may be any of a sedan, a sport utility vehicle, a van, a truck, an autonomously operated vehicle, a gasoline engine vehicle, a battery electric vehicle or a hybrid vehicle. The vehicle seat 12 supports an occupant 22 during operation of the vehicle 20 and provides restraint during a vehicle collision event.

The restraint may be provided by a seat belt assembly 24 which includes an extending seat belt shoulder strap portion 26, a lap belt section 28, and a buckle 30 releasably connected to a first buckle connector 32. The first buckle connector 32 displaces from an initial first buckle connector position to a forward position to enable energy absorption and to mitigate against occupant submarining during a vehicle collision event and is described in greater detail in reference to FIGS. 3 through 19. The seat belt shoulder strap portion 26 is extended and retracted using a tensioning mechanism 34 and is fixed at one end to a second buckle connector 36. The second buckle connector 36, similar to the first buckle connector 32, displaces from an initial second buckle connector position to a forward position during the vehicle collision event to enable energy absorption and to mitigate against occupant submarining during the vehicle collision event.

Referring to FIG. 2 and again to FIG. 1, the seatbelt anchorage system 10 also includes a seat belt link 38 integrally connected to and extending from the first buckle connector 32. The seat belt link 38 is fixed using a first seat belt pin 40 to a seat frame structural member 42. During the vehicle collision event the occupant 22 may be displaced in a forward direction 44. This displacement is resisted by the seat belt assembly 24 including the shoulder strap portion 26 and the lap belt section 28. The lap belt section 28 is directly in contact with a hip portion 46 of the occupant 22. To mitigate against a submarining motion 48 as the occupant displaces forward, defined as the hip portion 46 of the occupant 22 sliding partially beneath the lap belt section 28, an initial angular orientation of the buckle 30, the first buckle connector 32 and the seat belt link 38 is retained by permitting a forward displacement of the buckle 30, the first buckle connector 32 and the seat belt link 38, with the forward displacement resisted by a first energy storage device 50. According to several aspects, the first buckle connector 32 also defines a first anchor of the seatbelt anchorage system 10 positioned on a first side of the vehicle seat 12 and the second buckle connector 36 also defines a second anchor of the seatbelt anchorage system 10 positioned on a second side of the vehicle seat 12 to anchor opposed ends of the lap belt section 28 to the hip portion 46 of the occupant 22.

Figure 2:
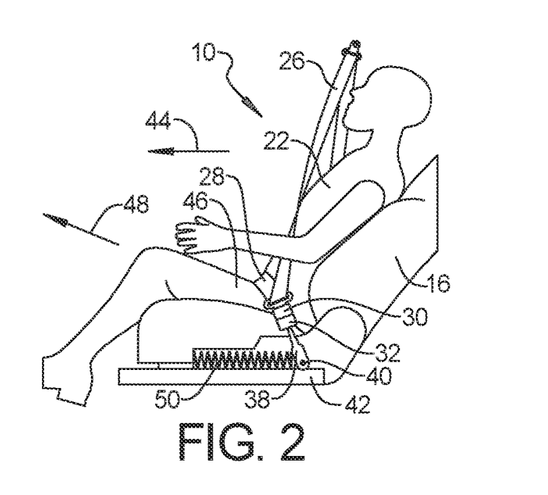
FIG. 2 is a left side elevational view of the vehicle seat of FIG. 1.

According to several aspects, the first energy storage device 50 defines a compression spring contacted by the seat belt link 38 and/or the first buckle connector 32 and compressed by forward displacement of the buckle 30, the first buckle connector 32 and the seat belt link 38. Allowing compression of the first energy storage device 50 mitigates against rotation of the seat belt link 38 about a central axis of the seat belt pin 40. By mitigating against rotation of the seat belt link 38 the lap belt section 28 is thereby retained in optimum contact with the hip portion 46 of the occupant 22.

Referring to FIG. 3 and again to FIGS. 1 and 2, an opposite side of the vehicle seat 12 includes a second seat belt pin 52 fixing the second buckle connector 36 to the seat frame structural member 42. To mitigate against the submarining motion 48 as the occupant 22 displaces forward, defined as noted above as the hip portion 46 of the occupant 22 sliding partially beneath the lap belt section 28, an initial angular orientation of the second buckle connector 36 is retained by permitting a forward displacement of the second buckle connector 36, with the forward displacement resisted by a second energy storage device 54. According to several aspects, the second energy storage device 54 also defines a compression spring contacted by the second buckle connector 36 and compressed by forward displacement of the second buckle connector 36.

Figure 3:
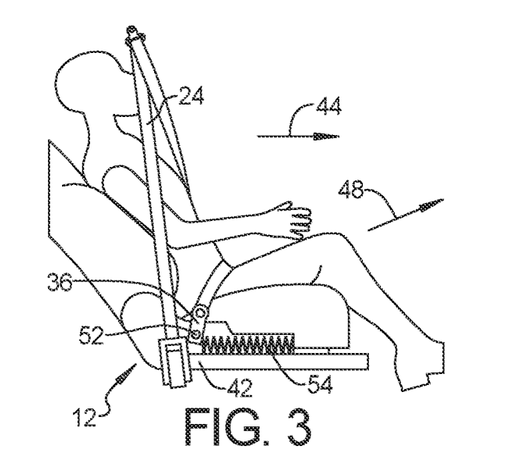
FIG. 3 is a right side elevational view of the vehicle seat of FIG. 1.

Referring to FIG. 4 and again to FIGS. 1 through 3, the vehicle seat 12 is shown in a seat back upright position having the occupant 22 seated in a normal driving or upright position. The first energy storage device 50 is shown in a fully extended, non-compressed condition having a first end 56 directly contacting the seat belt link 38 and an opposite second end 58 contacting a stop member 60 connected to the seat frame structural member 42. The first energy storage device 50 may also be positioned within a guide 62 such as a slot, a channel, a groove and the like formed or attached to the seat frame structural member 42.

Figure 4:
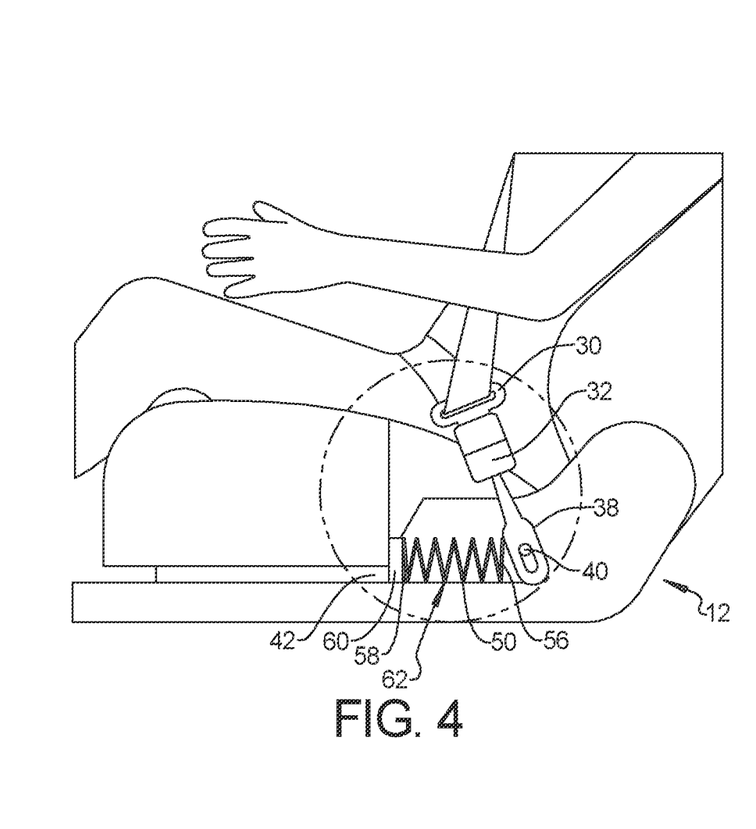
FIG. 4 is a left side elevational view modified from FIG. 2 showing additional system components.

Referring to FIG. 5 and again to FIGS. 2 and 4, the buckle 30, the first buckle connector 32 and the seat belt link 38 collectively define a first buckle assembly 64. A longitudinal axis 66 centrally extending through the buckle 30, the first buckle connector 32, the seat belt link 38 and the first seat belt pin 40 defines a nominal angle alpha (α) of approximately 75 degrees with respect to a horizontal axis 68 extending through a central axis of the first seat belt pin 40. The first buckle assembly 64 displaces forward during compression of the first energy storage device 50 described in reference to FIG. 2 to a forward displaced position defining the first buckle assembly 64'. At the forward displaced position defining the first buckle assembly 64' the longitudinal axis 66 is maintained as a longitudinal axis 66' and the angle alpha (α) of approximately 75 degrees is maintained as angle α'.

Figure 5:
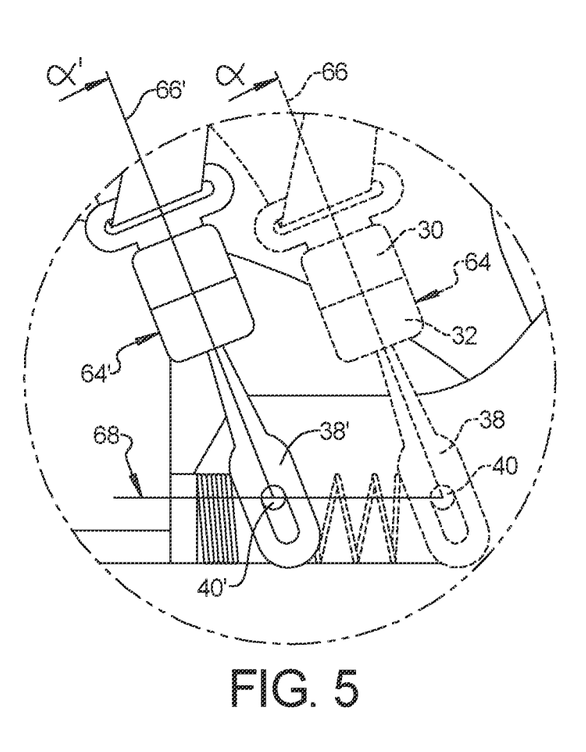
FIG. 5 is a left side elevational view modified from FIG. 2 showing initial and final displacement positions of a seat belt coupling of the present disclosure.

Referring to FIG. 6 and again to FIGS. 4 and 5, during the vehicle collision event a torso 70 of the occupant 22 rotates forward as shown and the first buckle assembly 64 displaces forward to the first buckle assembly 64' position. The first energy storage device 50 compresses to permit forward displacement of the first buckle assembly 64 and to retain contact of the lap belt section 28 with the hip portion 46 of the occupant 22.

Referring to FIG. 7 and again to FIG. 4, according to several aspects the first energy storage device 50 may be replaced by a compressive foam member 72. The compressive foam member 72 is longitudinally compressed as the first buckle assembly 64 displaces forward to the first buckle assembly 64' position shown in reference to FIG. 5. The compressive foam member 72 is positioned similar to the first energy storage device 50 in contact with the seat belt link 38 of the first buckle assembly 64 and oppositely in contact with the stop member 60.

Figure 7:
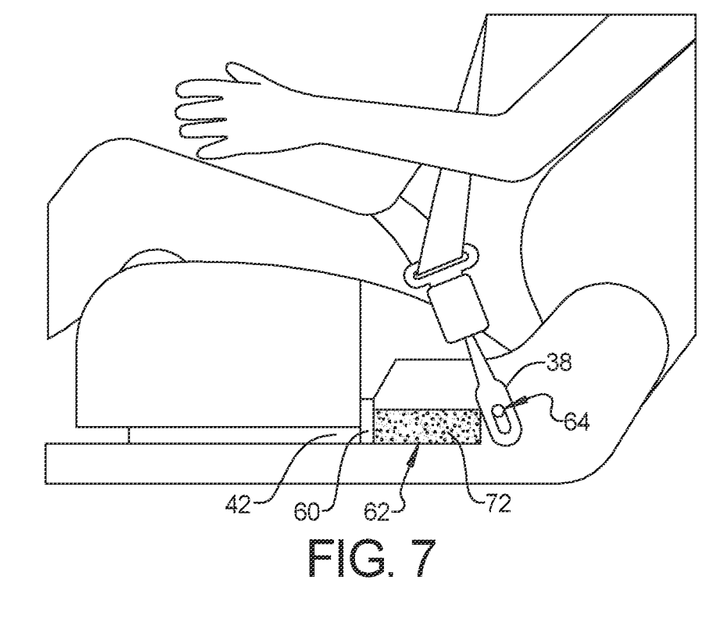
FIG. 7 is a left side elevational view modified from FIG. 2 showing alternate system biasing component aspects.
Figure 8:
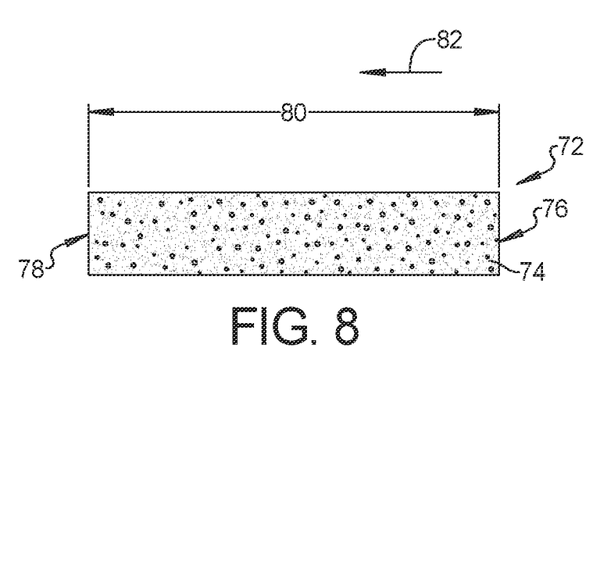
FIG. 8 is a front elevational view of the biasing component of FIG. 7.

Referring to FIG. 8 and again to FIG. 7, the compressive foam member 72 has a foam body 74 of a generally rectangular shape with a first end face 76 and a generally parallel second end face 78. A length 80 of the compressive foam member 72 is predetermined to substantially match a compression length of the first energy storage device 50 as the first energy storage device 50 is compressed in a longitudinal direction 82 by displacement of the first buckle assembly 64.

Figure 9:
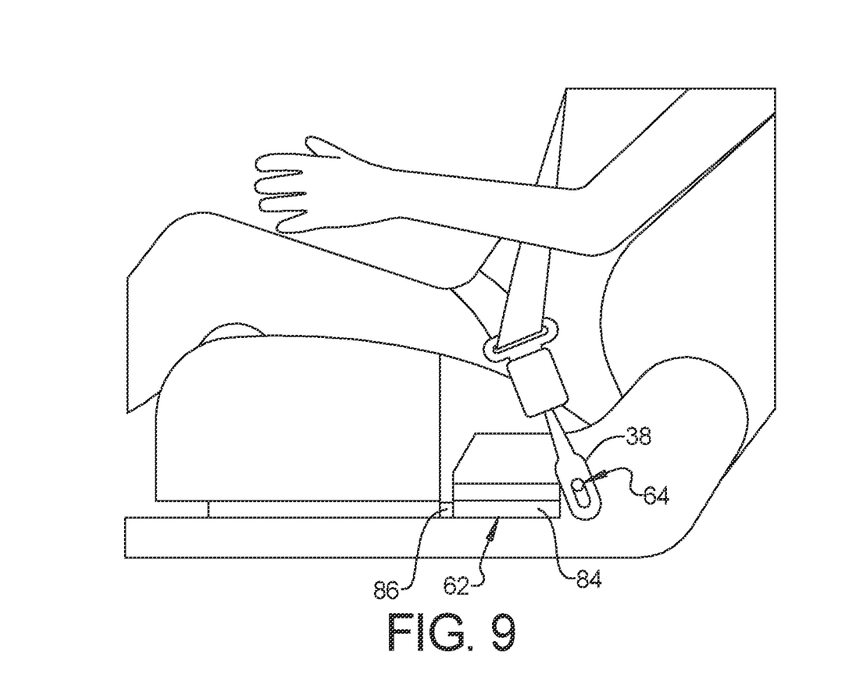
FIG. 9 is a left side elevational view modified from FIG. 2 showing alternate system biasing component aspects

Referring to FIG. 9, according to several aspects the first energy storage device 50 may be replaced by a shearing member 84. The shearing member 84 is longitudinally sheared as the first buckle assembly 64 displaces forward to the first buckle assembly 64' position shown in reference to FIG. 5. The shearing member 84 is positioned similar to the first energy storage device 50 and functions by motion of the seat belt link 38 of the first buckle assembly 64 and is oppositely retained in contact with a modified stop member 86.

Figure 10:
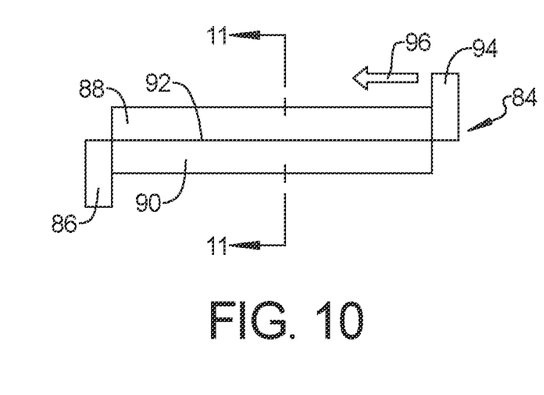
FIG. 10 is a front elevational view of the biasing component of FIG. 9.

Referring to FIG. 10 and again to FIG. 9, the shearing member 84 includes an upper or first half 88 and a lower or second half 90 separated by a frangible shearing member 92. The modified stop member 86 is fixed to the seat frame structural member 42 and is modified from the stop member 60 to only be in direct contact with the second half 90. A push block 94 is positioned in direct contact with the first half 88 and with the seat belt link 38. The push block 94 when displaced by the seat belt link 38 displaces the first half 88 to apply a predetermined shearing force 96 as the second half 90 is retained by the modified stop member 86, resulting in longitudinal shearing of the frangible shearing member 92 and separation of the first half 88 from the second half 90.

Figure 11:
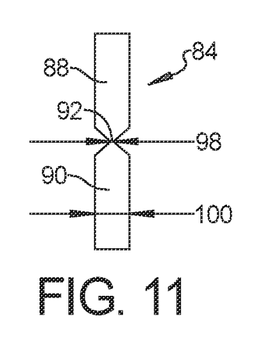
FIG. 11 is a cross sectional view taken at section 11 of FIG. 10 of the biasing component of FIG. 10.

Referring to FIG. 11, the frangible shearing member 92 has a thickness or width 98 substantially thinner than a width 100 of both of the first half 88 and the second half 90. The width 98 is predetermined to permit the shearing force 96 to separate the first half 88 from the second half 90.

Figure 6:
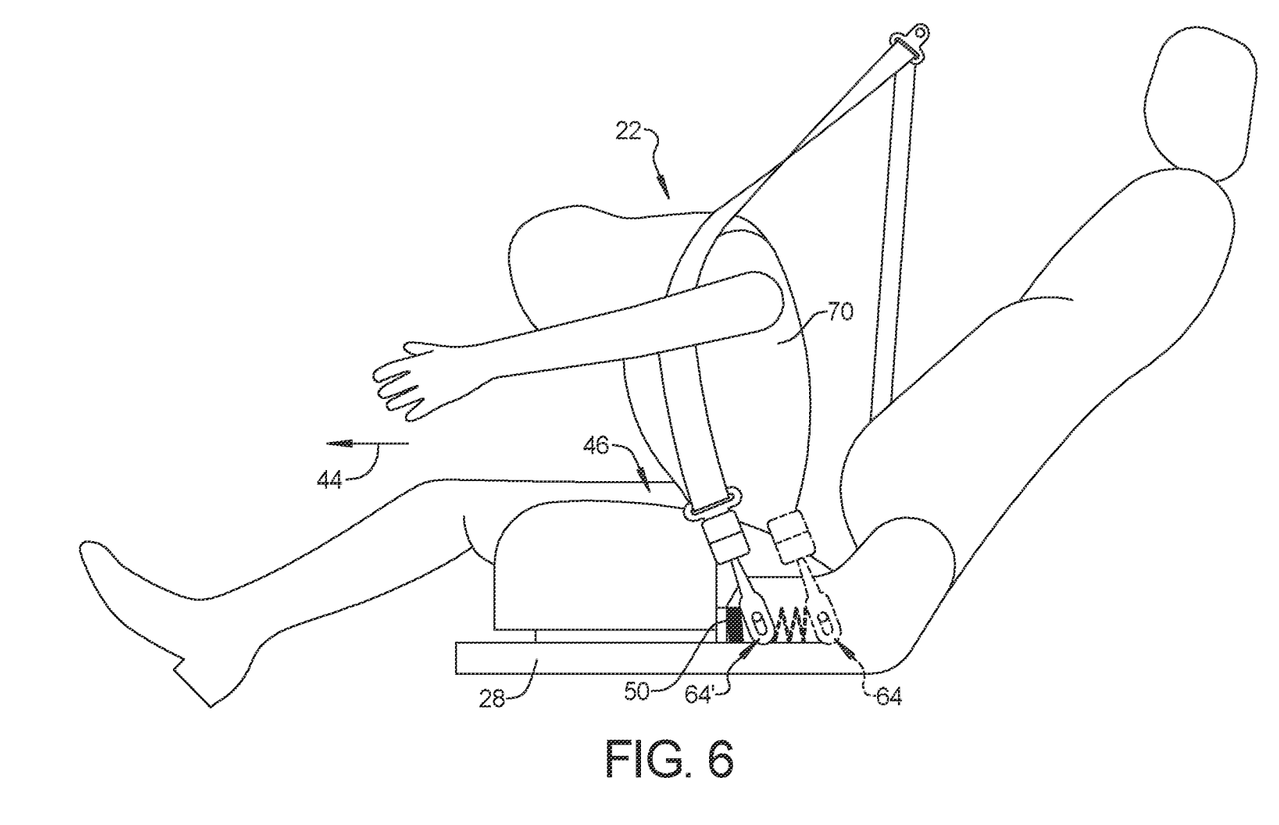
FIG. 6 is a left side elevational view modified from FIG. 5 showing occupant motion.

Referring to FIG. 12 and again to FIGS. 4 through 6, according to further aspects, a seatbelt anchorage system 102 is modified from the seatbelt anchorage system 10. A seat back frame member 104 is rotatably connected to the seat frame structural member 42 by a pin 106 shown in reduced size form for clarity. The seat back frame member 104 is shown in an upright position. A hook-shaped bar 108 is substantially rigid and is received through the pin 106 with a straight segment 110 extending through and beyond the pin 106 and fixed to the pin 106. The hook-shaped bar 108 rotates during axial rotation of the pin 106. A hook-end 112 of the hook-shaped bar 108 is positioned to directly contact a buckle mounting bolt 114 which connects to a buckle assembly, not shown for clarity, similar to the first buckle assembly 64 shown and described in reference to FIG. 5. The buckle mounting bolt 114 is slidably positioned and displaced within a slotted chamber 116 and contacts a biasing member 118 such as a compression spring. The biasing member 118 is retained opposite to the buckle mounting bolt 114 by a stop member 120 similar to the stop member 60 shown and described in reference to FIG. 4.

Figure 12:
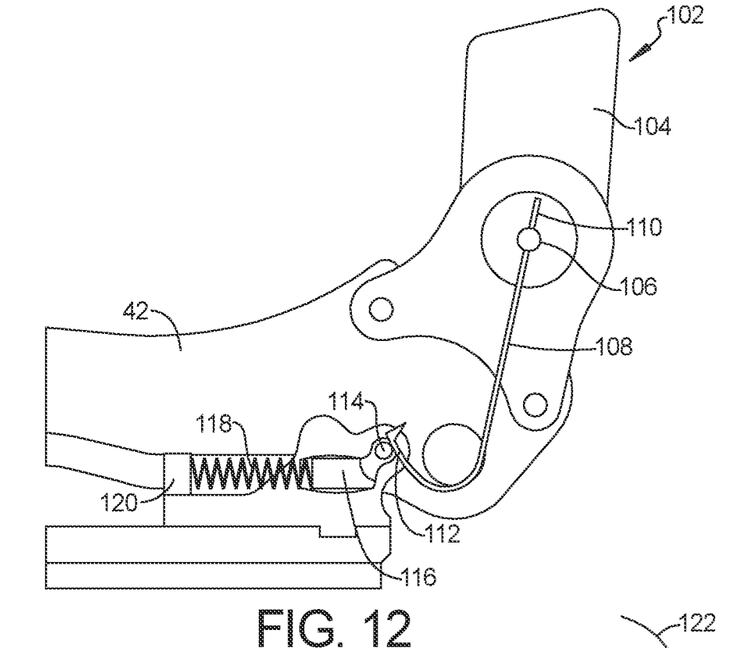
FIG. 12 is a left side elevational view modified from FIG. 2 showing aspects of a modified seatbelt anchorage system of the present disclosure in a seat back frame upright position.

Referring to FIG. 13 and again to FIG. 12, during rotation of the seat back frame member 104 with respect to the seat frame structural member 42 about an arc of rotation 122 away from the upright position shown in FIG. 12 to a reclined position shown, the hook-shaped bar 108 rotates together with the pin 106 such that the hook-end 112 displaces the buckle mounting bolt 114 which compresses the biasing member 118. The first buckle assembly 64 shown and described in reference to FIG. 5 is displaced as previously described in reference to FIG. 5 by displacement of the buckle mounting bolt 114. According to several aspects, a contact feature 124 may be positioned within the slotted chamber 116 between the buckle mounting bolt 114 and the biasing member 118 to provide additional mechanical advantage for compressing the biasing member 118. It is noted the geometry of the slotted chamber 116 directs a travel motion of the buckle mounting bolt 114 both forward and downward. The downward portion of the buckle mounting bolt 114 travel motion further pulls the lap belt section 28 shown and described in reference to FIGS. 1 through 6 downward to maintain positive frictional contact of the lap belt section 28 with the hip portion 46 of the occupant 22 to help mitigate against submarining motion of the hip portion 46.

Figures 13, 14:
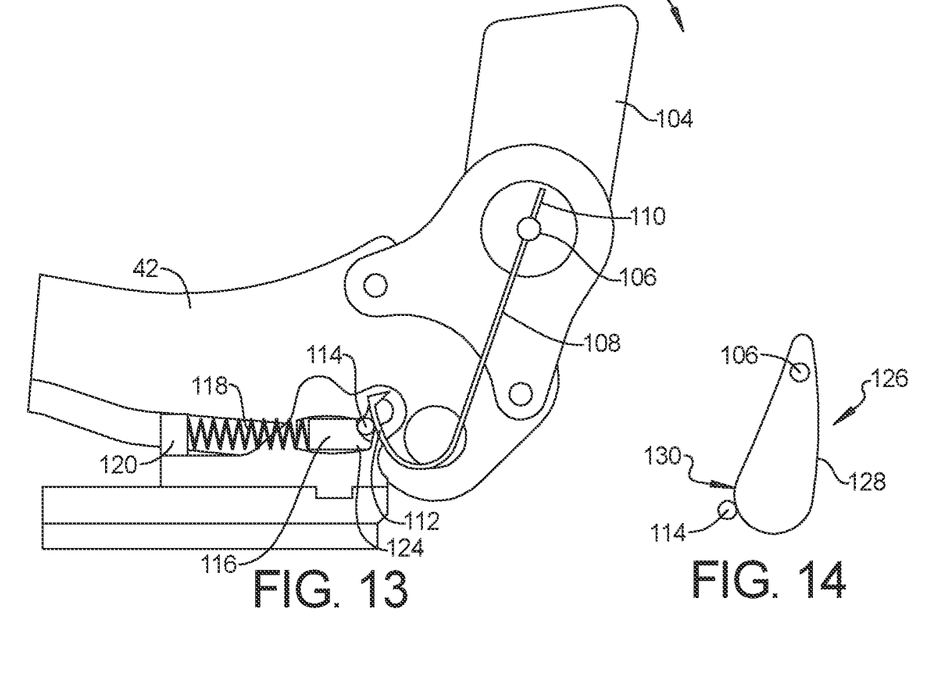
FIG. 13 is a left side elevational view showing the modified seatbelt anchorage system of FIG. 12 in a seat back frame reclined position.
FIG. 14 is a left side elevational view of an alternate biasing member for the modified seatbelt anchorage system of FIG. 12.

Referring to FIG. 14 and again to FIGS. 12 and 13, a teardrop-shaped member 126 may be used in place of the hook-shaped bar 108. The teardrop-shaped member 126 includes a body 128 receiving the pin 106 at a first end. A bulbous and curved second end 130 directly contacts the buckle mounting bolt 114 which compresses the biasing member 118 similar to the function of the hook-end 112 described in reference to FIG. 13.

Referring to FIG. 15 and again to FIGS. 1 through 6, a vehicle seat 132 is shown and configured as a vehicle passenger seat and is further modified from the vehicle seat 12 to further include a first buckle connector 134 defining a first anchor similar to the first buckle connector 32 and having the first buckle connector 134 slidably disposed in a first curved slot 136 extending through a first bolster 138 of the seat cushion 14' to direct a curved and downward travel path of the first buckle connector 134 as the first buckle connector 134 moves forward during a vehicle collision event. The vehicle seat 132 further includes a second buckle connector 140 defining a second anchor similar to the second buckle connector 36 and having the second buckle connector 140 slidably disposed in a second curved slot 142 extending through a second bolster 144 of the seat cushion 14' to direct a curved and downward travel path of the second buckle connector 140 as the second buckle connector 140 moves forward during a vehicle collision event.

Figure 15:
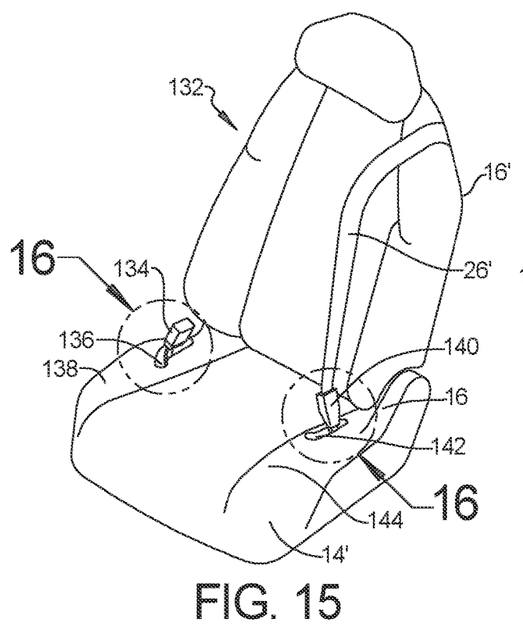
FIG. 15 is a front left perspective view of a vehicle seat having a modified seatbelt anchorage system of the present disclosure.

Referring to FIG. 16 and again to FIG. 15, due the curved geometry of the first curved slot 136 and the second curved slot 142, and due to the downward and inward directed slope of the first bolster 138 and the second bolster 144, the first buckle connector 134 having a seat belt link 146 connected to the first buckle connector 134 defining the first anchor displaces within a first slot portion 148 initially in a forward direction 150 until the seat belt link 146 reaches an inward curving portion 152 of the first curved slot 136, after which the first buckle connector 134 displaces both in an inward direction 154 and a downward direction 156. Similarly, the second buckle connector 140 defining the second anchor having a seat belt link 158 connected to the second buckle connector 140 displaces within a first slot portion 160 of the second curved slot 142 initially in a forward direction 162 until the seat belt link 158 reaches a first slot portion 164 of the second curved slot 142, after which the second buckle connector 140 displaces both in an inward direction 166 and a downward direction 168. The combination of both the inward and downward displacements of the first buckle connector 134 and the second buckle connector 140 contract the lap belt section 28 around the hip portion 46 of the occupant 22, while also pulling the lap belt section 28 downwardly to further enhance mitigation of submarining of the occupant 22.

Figure 16:
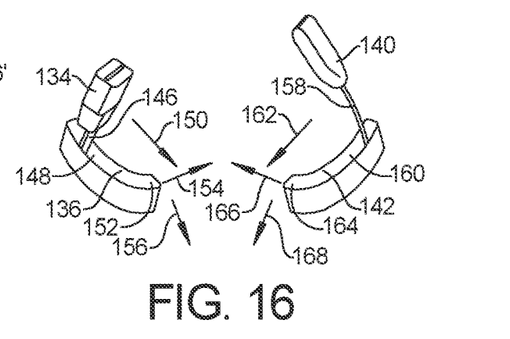
FIG. 16 is a front elevational view of the curved slots of the vehicle seat of FIG. 15.

Referring to FIG. 17 and again to FIGS. 15 and 16, according to several aspects, a biasing member 170 may be disposed in the second curved slot 142, the biasing member 170 defining a tension spring connected to the seat belt link 158 providing a biasing force acting to initially hold the second buckle connector 140 at the first slot portion 160 of the second curved slot 142.

Figure 17:
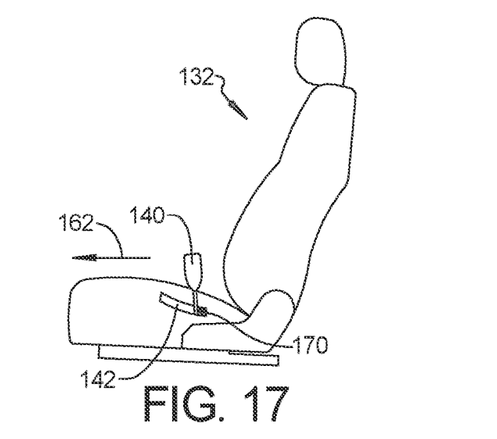
FIG. 17 is a side elevational view of the vehicle seat of FIG. 1 modified to include curved slots for seat belt buckle travel, with the seat belt buckle in an initial position with a tension member.
Figure 18:
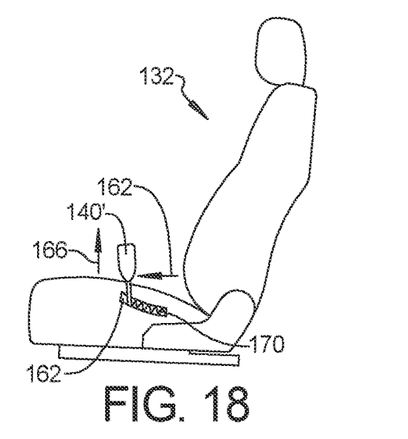
FIG. 18 is a side elevational view of the vehicle seat of FIG. 17 showing the seat belt buckle in a forward or final position.

Referring to FIG. 18 and again to FIGS. 15 through 17, as the occupant 22 displaces forward in the forward direction 162 as shown in reference to FIG. 6, the second buckle connector 140 is pulled forward in the forward direction 162 to an extended position identified as the second buckle connector 140', thereby extending the biasing member 170 and increasing a biasing force of the biasing member 170.

Referring to FIG. 19 and again to FIGS. 15 through 18, according to several aspects, a biasing member 172 may be disposed in the first curved slot 136, the biasing member 172 defining a compression spring or a mechanism is connected to the seat belt link 146, the biasing member 172 initially extended providing a biasing force acting to initially hold the first buckle connector 134 at the first slot portion 148 of the first curved slot 136.

Referring to FIG. 20 and again to FIGS. 15 through 19, as the occupant 22 shown in FIG. 6 displaces forward in the forward direction 150 as shown in reference to FIG. 6, the first buckle connector 134 is pushed forward in the forward direction 150 to an extended position identified as the first buckle connector 134', thereby compressing the biasing member 172 and increasing a biasing force of the biasing member 172.

Figure 19:
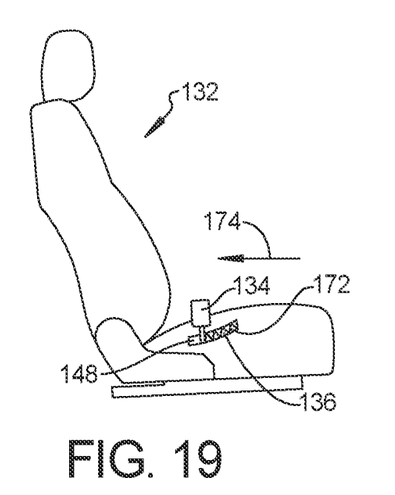
FIG. 19 is a side elevational view modified from FIG. 17 to include a compression member.
Figure 20:
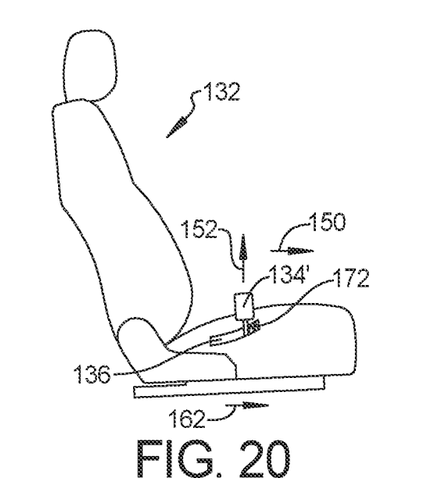
FIG. 20 is a side elevational view of the vehicle seat of FIG. 19 showing the seat belt buckle in a forward or final position.

It is noted the biasing member 172 may be used in both the first curved slot 136 and the second curved slot 142. It is also noted the biasing member 170 may also be used in both the second curved slot 142 and the first curved slot 136.

Figure 21:
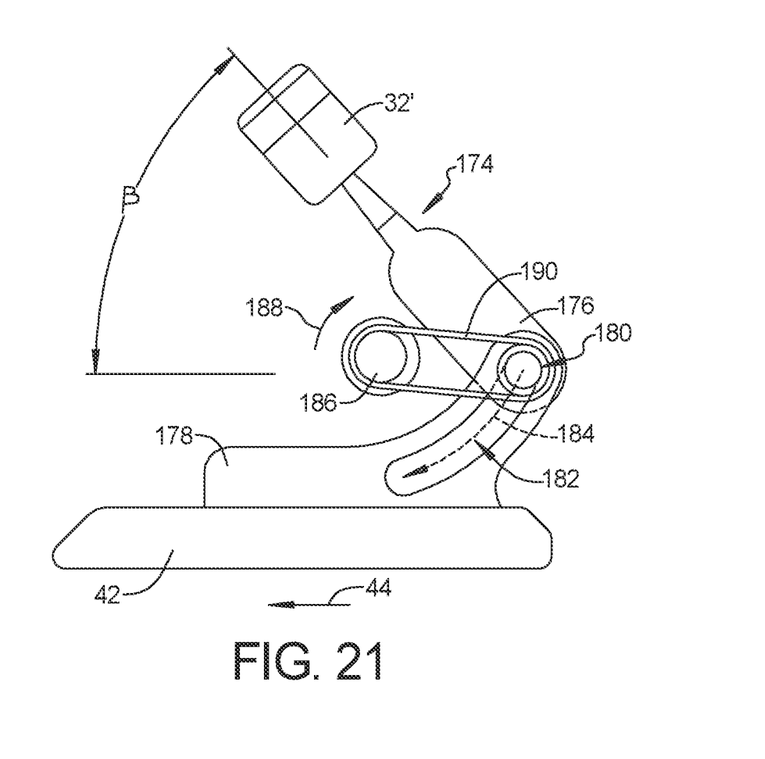
FIG. 21 is a side elevational view of a seatbelt anchorage system having a tensioning device.

Referring to FIG. 21 and again to FIGS. 1 through 20, according to several aspects, a seatbelt anchorage system 174 is modified from the seatbelt anchorage system 10 and the seatbelt anchorage system 102. The seatbelt anchorage system 174 includes a seat belt link 176 similar to the seat belt link 38 connected to the buckle connector 32'. The seat belt link 176 is rotatably connected to a seat structural member 178 using a pin 180 to allow rotation and angular displacement of the seat belt link 176. The pin 180 is slidably received in an angular slot 182 allowing the pin to displace within the angular slot 182 about an arc of rotation 184. As the pin 180 displaces in the angular slot 182 during forward motion of the occupant 22 in the forward direction 44 similar to as shown in FIG. 6, it is desirable to maintain an angle beta (β) similar to the angle α described in reference to FIG. 5 with respect to a horizontal plane extending through an axial center of pin 180. A tensioning device 186 rotating in a direction of rotation 188 induces a tensioning force on a tensioning strap 190 contacting the pin 180 to maintain the angle β during motion of the pin 180.

The seatbelt anchorage system 10 of the present disclosure allows the lap belt and buckle anchorages to move forward (and downward) in a frontal impact. This provides anergy absorption function while the anchorage moves forward and/or inward thereby narrowing the buckle and anchorage distance to better constrain the pelvis. A pin at the sliding slot allows the anchorage to be in place for normal driving conditions and to be removed or sheared off during a frontal impact. A seatbelt anchorage point and buckle attachment forward movement is provided to mitigate against occupant submarining motion during a vehicle frontal impact defining a collision event. Submarining is mitigated by the forward moment of an anchorage with dummy movements.

A seatbelt anchorage system 10 of the present disclosure offers several advantages. These include allowing lap belt and buckle anchorages to slide forward in a frontal impact scenario with energy absorption functions while the seat belt anchorage is also sliding forward to thereby reduce an occupant submarining tendency. Allowing the lap belt anchorage point to move forward also reduces a lap belt angle relative to the vehicle floor which thereby mitigates a submarining tendency.

What is claimed is:

1. A seatbelt anchorage system, comprising:
   a vehicle seat connected in a vehicle;
   a seat belt assembly of the vehicle seat having an extending seat belt shoulder strap portion, a lap belt section, and a buckle releasably connected to a first buckle connector, the first buckle connector defining a first anchor connected by a first pin to a seat structural member, the first pin and the first buckle connector together displacing during a vehicle collision event from an initial first buckle connector position to a final first buckle connector position forward of the initial first buckle connector position to mitigate against a submarining motion of an occupant of the vehicle seat; and
   the lap belt section fixed to a second buckle connector, the second buckle connector defining a second anchor connected by a second pin to the seat structural member, the second pin and the second buckle connector together displacing during the vehicle collision event from an initial second buckle connector position to a final second buckle connector position forward of the initial second buckle connector position,
   wherein a seat cushion of the vehicle seat includes a first bolster and a second bolster opposed to the first bolster, the first bolster and the second bolster being individually angled inward toward each other and downward;
   a first curved slot created in the first bolster; and
   a first seat belt link connected to the first buckle connector and displaced within a first slot portion of the first curved slot initially in a forward direction until the first seat belt link reaches an inward curving portion of the first curved slot, after which the first buckle connector displaces both in an inward direction and a downward direction pulling the lap belt section downward into contact with the hip portion of the occupant of the vehicle seat.

2. The seatbelt anchorage system of claim 1, wherein the lap belt section during use of the seat belt assembly is maintained directly in contact with a hip portion of an occupant of the vehicle seat by the first anchor and the second anchor and resists displacement of the occupant in a forward direction and partially under the lap belt section defining the submarining motion during the vehicle collision event.

3. The seatbelt anchorage system of claim 2, wherein an angular orientation of the first buckle connector to a floor of the vehicle and of the second buckle connector with respect to the floor of the vehicle are retained during displacement of the first buckle connector to the final first buckle connector position, and during displacement of the second buckle connector to the final second buckle connector position.

4. The seatbelt anchorage system of claim 1, including:
   a first energy storage device in contact with the first buckle connector; and
   a second energy storage device in contact with the second buckle connector; and
   wherein the first energy storage device and the second energy storage device act individually to resist forward displacement of the first buckle connector and the second buckle connector and to mitigate against the occupant submarining motion.

5. The seatbelt anchorage system of claim 4, wherein the first energy storage device and the second energy storage device individually define compression springs individually positioned forward of the first buckle connector and the second buckle connector and compressed by forward displacement of the first buckle connector or the second buckle connector.

6. The seatbelt anchorage system of claim 4, wherein the first energy storage device and the second energy storage device individually define tension springs individually positioned rearward of the first buckle connector and the second buckle connector and elastically extended by forward displacement of the first buckle connector or the second buckle connector.

7. The seatbelt anchorage system of claim 4, including a seat belt link integrally connected to and extending from the first buckle connector, the seat belt link receiving the first pin, wherein a biasing force of the first energy storage device mitigates against rotation of the seat belt link about a central axis of the first pin, retaining the lap belt section in direct contact with a hip portion of the occupant of the vehicle seat.

8. The seatbelt anchorage system of claim 4, wherein the first energy storage device and the second energy storage device individually define one of: a compressive foam member longitudinally compressed as the first buckle connector and the second buckle connector displace forward; and a shearing member longitudinally sheared as the first buckle connector and the second buckle connector displace forward.

9. The seatbelt anchorage system of claim 1, including:
    a second curved slot created in the second bolster; and
    a second seat belt link connected to the second buckle connector displaced within a first slot portion of the second curved slot initially in a forward direction until the seat belt link reaches an inward curving portion of the second curved slot, after which the second buckle connector displaces both in an inward direction and a downward direction pulling the lap belt section downward into contact with the hip portion of the occupant of the vehicle seat.

\* \* \* \* \*